United States Patent [19]

Bynum

[11] 4,251,782

[45] Feb. 17, 1981

[54] MULTIPLE TUNED CIRCUIT CORRECTION APPARATUS

[75] Inventor: Brian T. Bynum, Dallas, Tex.

[73] Assignee: Rockwell International Corporation, El Segundo, Calif.

[21] Appl. No.: 4,090

[22] Filed: Jan. 17, 1979

[51] Int. Cl.³ ............................................... H04B 3/04
[52] U.S. Cl. ...................................... 333/18; 307/359; 375/12
[58] Field of Search ................. 333/17 R, 18, 28 R; 325/323, 404, 413, 414, 477; 455/232, 239, 247, 248, 253, 296, 303, 306; 328/162; 307/358, 359; 375/11, 12

[56] References Cited

U.S. PATENT DOCUMENTS

| | | | |
|---|---|---|---|
| 2,521,507 | 9/1950 | Dysart | 333/18 X |
| 2,550,595 | 4/1951 | Pfleger | 333/18 X |
| 2,876,283 | 3/1959 | Lundry | 333/18 X |
| 3,671,886 | 6/1972 | Fudemoto et al. | 333/18 |
| 4,003,006 | 1/1977 | Mandeville et al. | 333/18 X |

*Primary Examiner*—Paul L. Gensler
*Attorney, Agent, or Firm*—Bruce C. Lutz; Howard R. Greenberg; H. Fredrick Hamann

[57] ABSTRACT

Circuitry for detecting the spectral distribution of a signal that is phase indicative of a digital logic level and providing feedback signals for use in adjusting the amplitude of the signal spectrum to reduce signal distortion toward a value which is substantially identical with the transmitted signal for all points over a given frequency bandwidth. The correction is obtained by applying voltages to variable impedance pin diodes forming part of a series set of tuned filter circuits.

6 Claims, 4 Drawing Figures

MULTIPLE TUNED CIRCUIT CORRECTION APPARATUS

THE INVENTION

The present invention is generally related to electronics and more specifically related to transmission and reception of alternating waveform variable phase signals indicative of digital logic levels.

It is known in the prior art that multipath interference can cause a notch in the envelope of the spectra of received signals as detected in a microwave receiver if the interfering signal is 180 degrees out-of-phase with respect to the incident signal. A multipath condition can also cause the envelope amplitude of signals in a given RF spectrum used to transmit the information to tilt in the microwave receiver if the interfering signal is at a phase angle, with respect to the incident signal, which is some value other than 180 degrees. For conditions to be corrected by one embodiment of the invention which removes only amplitude slope distortion, the relating phase angle must be outside the range of $180° \pm 25°$. However, when compensation is realized using multiple tuned circuits, distortion conditions can be improved over the full 360° range of the interfering signal phase angle.

It has also been determined that whenever the envelope amplitude of the signals comprising the RF spectrum under consideration as received by a digital radio is tilted, the tilt causes a degradation in the bit error rate performance of the radio receiver system. In fact, the bit error rate (BER) performance degrades very rapidly as the signal amplitude of the received spectrum of signals is tilted, while higher order distortion characteristics degrade performance less rapidly. Although it might be assumed that limiting the amplitude of the signals would correct the problem, it has been determined that such limiters degrade the bit error rate performance even more. Limiters cannot correct the distortion of the waveform zero crossings which are displaced by the spectrum amplitude distortion.

Some of the above determinations as well as general information on the effective selective fading on digital radio receiver performance is outlined in a paper given by Bell-Northern Research of Ottawa, Canada, and authored by C. W. Anderson, et al, entitled, "The Effect of Selective Fading on Digital Radio". This paper may be found in the 1978 ITTT International Communications Conference and presented on pages 33.5.1 through 33.5.6 in the conference report. While this article indicates that adaptive linear amplitude equalizing is necessary to combat multipath interference, no indication is provided therein as to how such might be accomplished. The present invention solves that problem of accurate detection of information contained in signals having amplitude tilt due to multipath interference and also solves the problem of a "notch" in the envelope of the received signal spectrum. For a partial solution to the stated problem, the reader's attention is directed to co-pending applications No. 004,089 and No. 004,091 filed on even date herewith.

In various publications such as *Filtering in the Time and Frequency Domains* by Blinchikoff et al. published by Wiley and Sons on page 50, the transfer function of a transmission medium is defined as $H(s) = R(s)/T(s)$ where $R(s)$ and $T(s)$ are the Laplace transforms of the received signal and the transmitted signal, respectively, and $s = j2\pi f_n$ where $f_n$ is frequency normalized to the band center frequency. $H(s)$ can be expressed as a power series in s, $H(s) = K_0 + K_1 s + K_2 s^2 + K_3 s^3 + \ldots K_m s^m$. For distortionless transmission, all terms in the power series except $K_0$ are negligible. Thus the received signal is at every frequency related to the transmitted signal by the same constant, $K_0$, and $R(s) = K_0 T(s)$. When multipath distortion occurs, the constants $K_1$ through $K_m$, change as a function of time (due to changes in the relative amplitude and delay of the two or more signal paths) and often become significant with respect to $K_0$ producing extraneous received signal components which are distorted replicas of the transmitted signal.

$$R(s) = K_0 T(s) + K_1 s\, T(s) + K_2 s^2 T(s) + \ldots$$
$$K_m s^m T(s) + K_0 T(s) + K_1' f_n T(s) + K_2' f_n^2 T(s) + \ldots$$
$$K_m' f_n^m T(s).$$

The first order coefficient, $K_1$, is seen to introduce a distorted received signal component which varies linearly with frequency. This term represents the amplitude "tilt" component which is most often present under multipath conditions. The second order coefficient, $K_2'$, is seen to introduce a parabolic distortion component which varies symmetrically about the band center frequency. Higher order distortion components introduced by multipath conditions are represented by $K_m$, where m indicates the degree of the component, which in turn indicates how the distortion term varies with frequency.

It may be noted as this point that the problem of multipath propagation of microwave signals and the transmission distortion resulting therefrom has existed for some time. However, when FM modulation is used as the method to convey voice traffic over microwave paths, the linear slope component in an FM system is tolerable since linear slope does not contribute to cross-modulation distortion. Moreover, prior art systems usually utilized either frequency or space diversity if high reliability was required. In this type of system the best of the two signals was utilized and the problems of distortion due to multipath propagation were substantially insignificant. A further reason for lack of attention to the present problem in the past was the absence in most FM receivers of phase locked loops with finite recovery times. The loss of phase lock in a microwave receiver can cause telephone users to be disconnected. The momentary static in a conversation produced by the distorted transmission of an FM signal was accepted as a necessary evil by the telephone user.

In present day operations, high reliability is increasingly required without the availability of frequency and/or space diversity and additionally most present systems utilize digital techniques which are more severely affected by multipath propagation.

The subject matter of the present invention was to operate in a radio in the gigahertz region and the present circuit was designed to be used in the IF stage immediately after the input signal was mixed with a local oscillator and prior to being demodulated. In operation, the signal obtained from the local oscillator is passed through a series circuit comprising a bandpass filter and a plurality of tuned filter circuits before being applied to the demodulator section. The order of connection of these last tuned circuits may be interchanged in accordance with the design objectives of the scheme. In a cost effective and preferred embodiment, three tuned circuits are used but more can be utilized to obtain better compensation. For one application of the invention, the desired band of frequencies was between 55 and 85 megahertz and the detected frequencies were 60 and 80 megahertz. After the signal is passed through the tuned circuits and accordingly corrected for distortion due to multipath problems, the signal is output to the demodulator section of the receiver. This signal is also passed to a total energy detector for use in providing a standard or reference to specific frequency detectors. This signal is also applied to frequency detectors at the midfrequency and the low and high end of the band of signals being passed. In other words, the three detectors would be in the neighborhood of 60, 70 and 80 megahertz for the embodiment discussed above. These detectors would provide an output relative to the signal obtained from the total energy detector to place the midfrequency signals at or near a standard value and adjust the amplitude of the low and high frequency signals to be substantially the same amplitude as the midfrequency signals.

As mentioned previously, more than three tuned circuits will provide even better compensation but will, in the process, require more circuitry to accomplish the desired result.

The above concept will operate at any frequency and the only limitation is state of the art components necessary to implement the function.

It is therefore an object of the present invention to provide amplitude tilt and higher order distortion compensation for an alternating signal over a given range of frequencies.

Another object of the present invention is to reduce multipath interference effects on received signals as they relate to causation of bit error rate performance degradation in digital radio receivers.

Other objects and advantages of the present invention may be ascertained from a reading of the specification and appended claims in conjunction with the drawings wherein:

DETAILED DESCRIPTION

Figure 1:
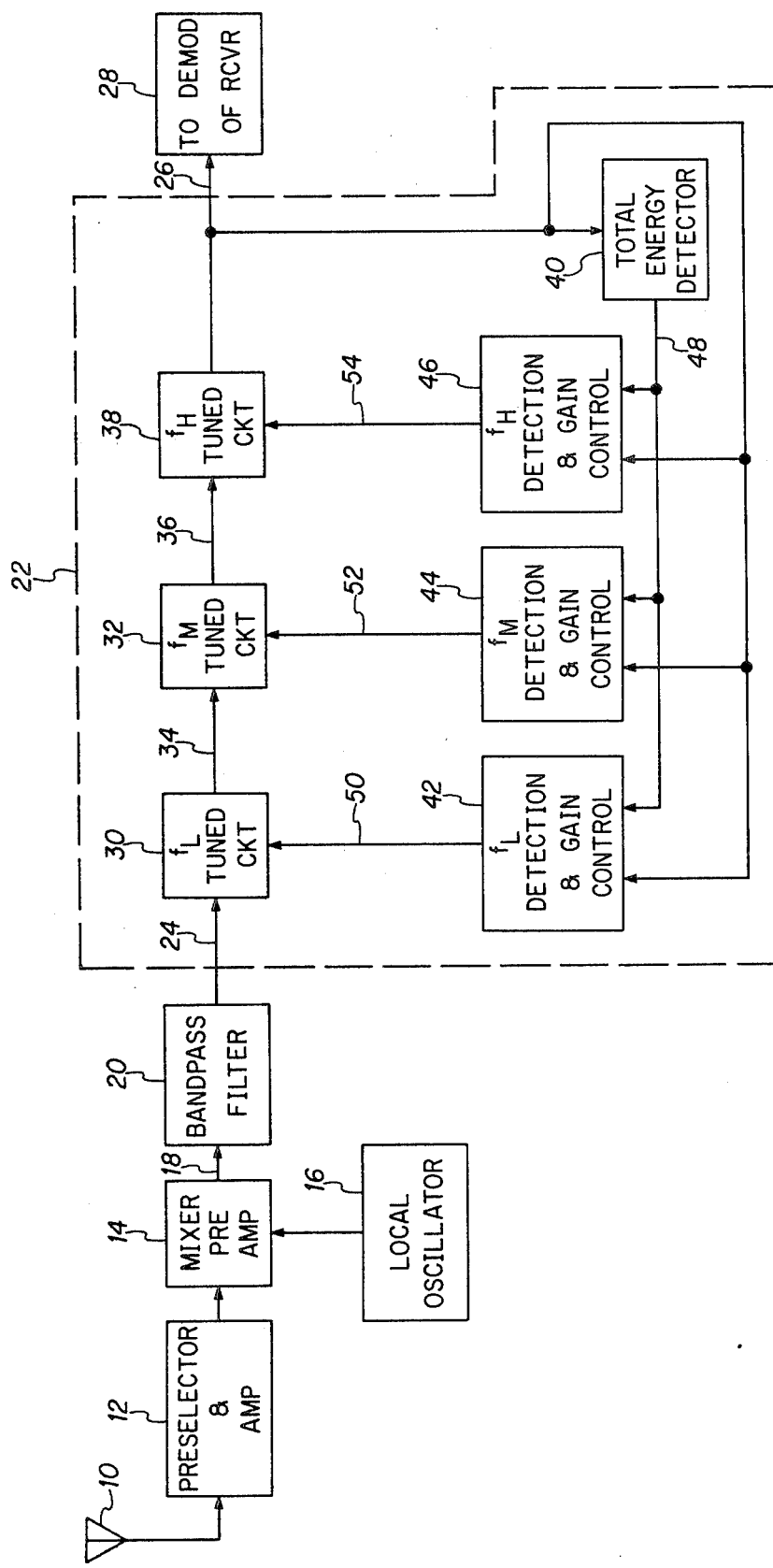
FIG. 1 is a block diagram of the overall inventive concept as utilized in a digital radio receiver.

In FIG. 1 an antenna 10 supplies signals to a preselector and amplifier block 12 which provides output signals to a mixer-preamplifier block 14. The mixer 14 also receives signals from a local oscillator 16 which results in an IF signal. The IF signal used as an example in explaining the operation of this invention is centered at 70 megahertz and is supplied on a lead 18 to a bandpass filter 20. Bandpass filter 20 supplies signals to a dash line block 22 on an output lead 24. The block 22 supplies output signals on a lead 26 to the demodulator section of a receiver labeled as 28. Within block 22 is an $f_L$ tuned circuit block or signal enhancing means 30 which receives signals from lead 24. Tuned circuit 30 is in series with an $f_M$ tuned circuit or signal enhancing means 32 and supplies signals thereto on a lead 34. Block 32 supplies signals on a lead 36 to a further signal enhancing means or tuned circuit $f_H$ designated as 38. Tuned circuit 38 supplies output signals to output lead 26 of block 22. Lead 26 also supplies signals to a total energy detector or reference level detector 40 as well as providing detection signal inputs to each of blocks 42, 44 and 46. Block 42 is an $f_L$ or low frequency detection and gain control circuit. Block 42 receives signals on an output lead 48 of total energy detector 40 and supplies control signals on a lead 50 to tuned circuit 30. Block 44 is an $f_M$ or middle frequency detection and gain control circuit and also receives signals on lead 48. Control output signals are supplied on a lead 52 from block 44 to $f_M$ tuned circuit 32. Finally, the block 46 is an $f_H$ or high frequency detection and gain control circuit and it also receives signals on lead 48 and supplies output control signals on a lead 54 to $f_H$ tuned circuit 38. While the low frequency tuned circuit 30 is shown first within block 22, in actuality the position of the various tuned circuits can be mixed and still practice the invention, and they are shown in this order merely for convenience and discussion of a preferred embodiment.

Figure 2:
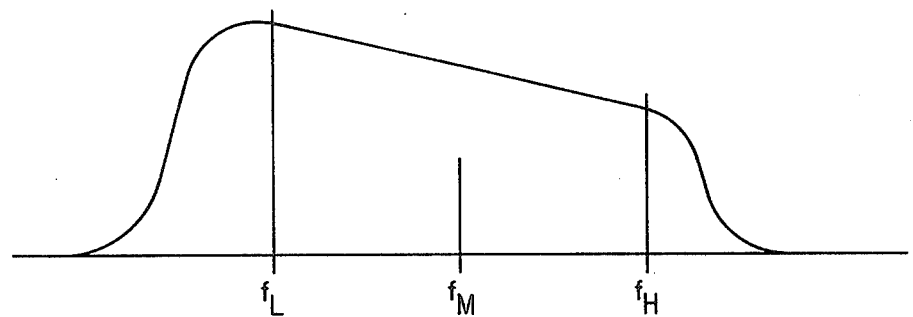
FIG. 2 illustrates the signal amplitude tilt which tilt is to be corrected by the present invention.

In FIG. 2, a distorted waveform of an incoming signal which has a tilt due to multipath distortion is shown.

Figure 3:
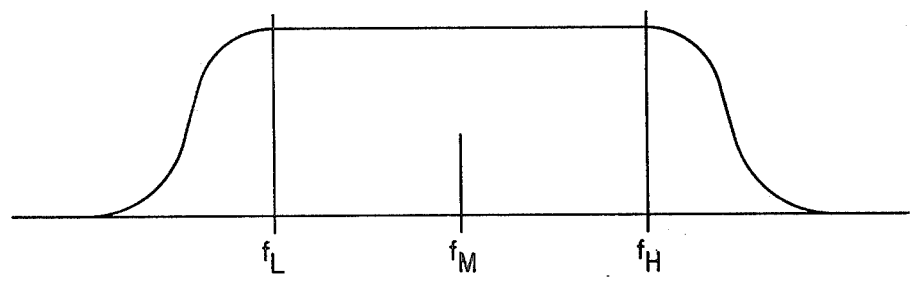
FIG. 3 illustrates the waveform of a corrected signal over the frequencies $f_L$ to $f_H$.

FIG. 3 illustrates the correction of the incoming signal of FIG. 2 so that the same amplitude of signals is obtained throughout the frequency band from $f_L$ to $f_H$.

Figure 4:
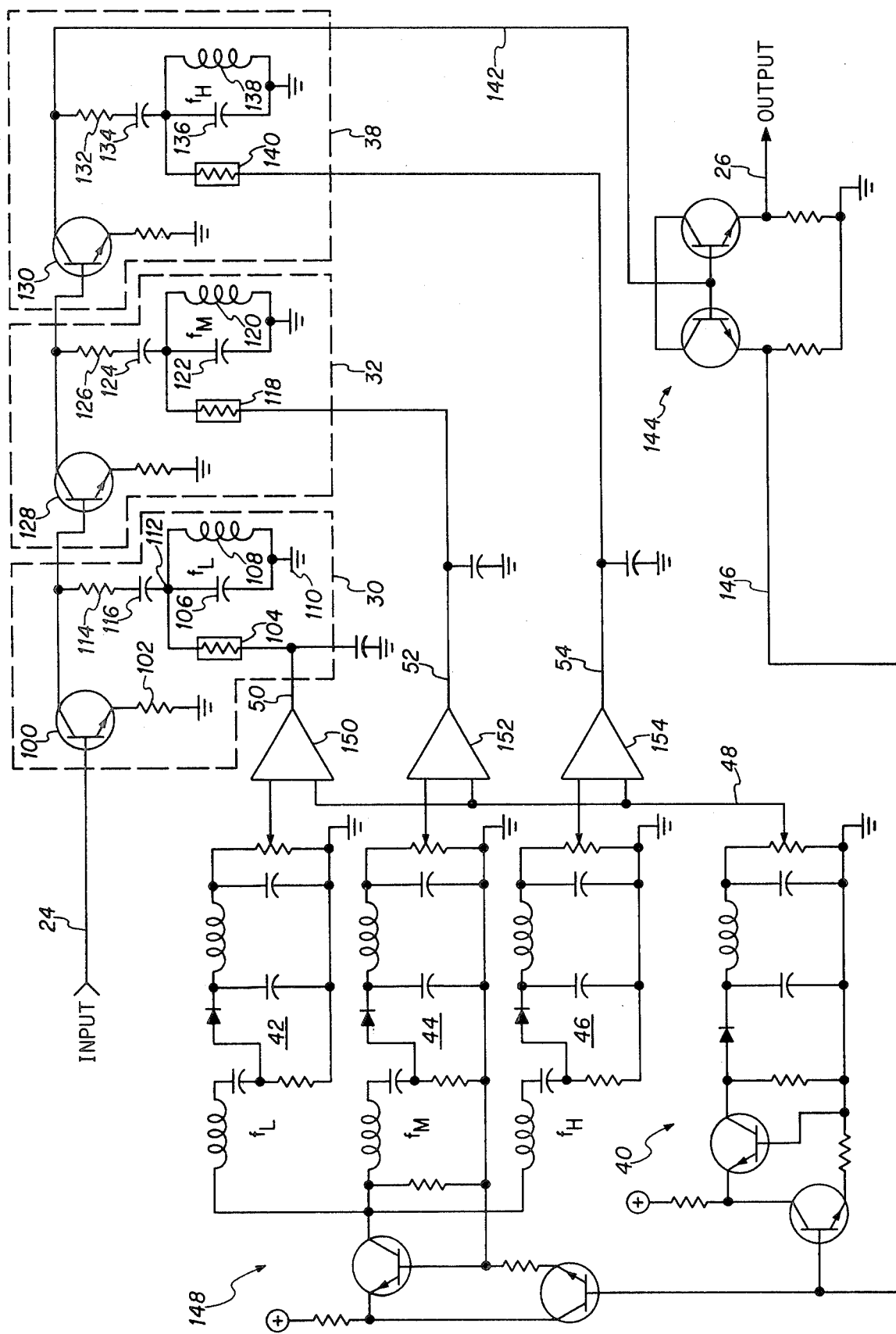
FIG. 4 is a detailed circuit diagram of the correction portion of FIG. 1.

In FIG. 4, a detailed illustration is provided of the block 22 of FIG. 1. Thus, the input lead is also labeled as 24 and the output lead is labeled as 26. The low frequency tuned circuit portion of this circuit, which is labeled as 30 in FIG. 1, is enclosed in dash lines and similarly labeled in this figure. The same holds true for many of the other blocks within FIG. 4. Within block 30 there is shown a transistor 100 with an emitter resistor 102. In the collector circuit of transistor 100, there is shown a variable resistance 104 which in one embodiment of the invention is a pin diode. Further, there is shown a capacitor 106 and an inductor 108 connected in parallel between ground 110 and a junction point 112. Finally, there is a resistor 114 and a capacitor 116 connected in series between junction point 112 and a collector of transistor 100. Within block 32 there is also a pin diode 118, an inductance 120, a capacitor 122, a capacitor 124 and a resistor 126 connected substantially the same as that shown within block 30. All of these components are connected so as to provide a load on a transistor 128.

While not numbered, there are capacitors connected between the outputs of amplifiers (used as comparators) 150, 152 and 154 and ground to remove extraneous AC signals from being applied to the tank circuit and to reduce the effect of output impedance variations of the amplifier on tank circuit Q.

A similar collection of components is found within block 38 which includes a transistor 130, a resistor 132, a pair of capacitors 134 and 136 along with an inductance 138 and a variable resistance or pin diode 140. An output of block 38 is shown on a lead 142 supplying signals to an isolation amplifier stage generally designated as 144 having the output lead 26. As illustrated, this isolation amplifier 144 also supplies signals on a lead 146 to a total energy detection circuit or wideband signal envelope detector circuit generally designated as 40. This signal is also supplied to a circuit generally indicated as 148 which is used for distribution to the various detection circuits 42, 44 and 46. As shown, the outputs of these detection circuits are supplied to amplifiers 150, 152 and 154 where the signals from the total energy circuit on lead 48 are used in a comparison process before being applied on leads 50, 52 and 54 respectively, to the tuned circuits 30, 32 and 38.

OPERATION

Referring first to FIG. 4, it will be noticed that there is a trap circuit 42 illustrated which is resonant near the low edge of the signal bandwidth or in other words, at $f_L$. This trap circuit exhibits a sufficiently high Q to allow detection of signal energy at $f_L$ without affecting the signal voltage at the resonant frequency of the other detectors 44 and 46 which are connected in parallel. Also, within circuit 42 is an envelope detector which is situated subsequent to the trap circuit and supplies a DC voltage proportional to the signal energy detected at the frequency $f_L$. The signals from trap circuit and detector circuit 42 are applied to the amplifier 150 which is used as a voltage comparator. This amplifier changes the amplitude of the detected level signals. A wideband signal envelope detector 40 is used to supply a controlled reference voltage for the comparator 150. By using the total energy detected as a reference, the error voltage generated by the comparator will always be proportional to the change in the energy detected as a percentage of the total energy. This percentage is known when the undistorted pseudorandom spectrum is received and is the signal parameter that should be maintained under multipath distortion conditions as well as normal operation. The error voltage generated by comparator 150 is used to control the current through and thus the resistance of a pin diode which in this case is 104. The voltage gain of the tuned circuit 30 containing the pin diode may be represented by formula 1.

$$\frac{V_o}{V_{in}} = \frac{1}{R_{102}} \left[ \frac{R_{114} + R_{104}}{1 + \frac{R_{104}}{j\omega L}\left(1 - \frac{\omega^2}{\omega_L^2}\right)} \right] \quad (1)$$

where $\omega_L = 2\pi f_L = \frac{1}{\sqrt{L_{108}C_{106}}}$

From the above equation, it will be noted that the voltage gain of stage 30 may be changed from no variation with frequency (when $R_{104}$ is much, much less than $R_{114}$) to a geometrically-symmetrical variation with frequency about the frequency $f_L$.

The trap circuit 46, which is resonant near the high end of the signal bandwidth $f_H$, starts the circuit control string which corrects for distortion at the high end of the signal bandwidth in the same manner as described above in connection with trap circuit 42 and comparator 150. Circuit 46 uses comparator 154 and supplies signals to the pin diode 140 of stage 38 with the variation centered about the frequency $f_H$. The circuits 30 and 38 work together to remove spectrum tilt while introducing a parabolic gain symmetrically about the center frequency $f_M$.

The voltage gain of circuit 32 varies symmetrically about the center frequency $f_M$ and tends to remove the parabolic component of the spectrum distortion introduced by stages 30 and 38 together, as well as the parabolic distortion component present due to the multipath fading.

Since parallel resonant tank circuits change impedance at a faster rate on the low frequency side of resonance than on the high side, slightly offsetting the center tank response of the tank circuit toward the low side, improves the match between the parabolic distortion component and the response of the center resonant circuit.

As discussed, although three correction circuits are shown, the technique also includes, in a less desirable embodiment, two tank circuits, one of which is out of band for tilt compensation and one centered in band for parabolic spectrum distortion compensation. As will be readily realized, however, more than three tank circuits may also be used, spaced both in and out of band which tend to remove distortion components of higher degree than parabolic.

It is believed from the above description that the operation of FIG. 1 will be completely apparent but a few comments will be made anyhow. The input signal is received by the antenna 10 and passed through the preselector and mixer as well as the bandpass filter to the present invention included within the circuitry of block 22. The signal arriving on lead 24 may be tilted either negatively, as shown in FIG. 2, or positively which is the opposite slope to that shown in FIG. 2. The signal initially passes through tuned circuits 30, 32 and 38 and is substantially unaltered until the various detection circuits 40, 42, 44 and 46 provide output control signals. These control signals are then utilized to adjust the impedance of the referenced tuned circuits to flatten the amplitude of the spectral components of the signal to that shown in FIG. 3 so that future signals applied to the demodulator 28 have substantially no discernible multipath distortion.

Although a preferred embodiment of the invention has been illustrated, it is to be realized that one skilled in the art will generate other embodiments using the same techniques as illustrated and I thus which to be limited only by the scope of the appended claims.

I claim:

1. Compensation apparatus comprising, in combination:

first means for supplying input signals having a spectral distribution of frequency components from $f_L$ to $f_H$ and including $f_M$ wherein the amplitude of the components may vary from the ideal of a constant level;

second means for supplying output signals which have been adjusted to remove level variations in spectral components over the frequency range of $f_L$ to $f_H$;

$f_L$, $f_M$ and $f_H$ tuned circuit means, each of said tuned circuit means including control signal input means, connected in series between said first and said second means;

reference level detection means, connected to said second means, for supplying a reference level signal indicative of total energy passed by said tuned circuit means;

$f_L$, $f_M$ and $f_H$ detection circuit means each connected to said second means and to said reference level detection means to receive inputs from said second means indicative of the adjusted signal after passage through said tuned circuit means and to receive said reference level signal, each of said detection circuit means including output means for providing output control signals indicative of the deviation of signals received at frequencies $f_L$, $f_M$ and $f_H$ respectively, from said reference level; and means connecting said output means of each of said detection means to a corresponding control signal input means of said $f_L$, $f_M$ and $f_H$ tuned circuit means.

2. Apparatus as claimed in claim 1 wherein said level variations resemble a "notch" and wherein:
said $f_M$ tuned circuit means is tuned to the frequency at which maximum "notch" effects occur in the signal supplied by said first meas for correcting opposing phase multipath interference.

3. The method of amplitude adjusting a received signal which may have amplitude variations resembling a "notch" between the frequencies $f_L$ and $f_H$ and outputting a compensated signal comprising the steps of:
adjusting the amplitude of the received signal at each of the frequencies $f_L$, $f_M$ and $f_H$ as a function of $f_L$, $f_M$ and $f_H$ control signals where $f_M$ is intermediate $f_L$ and $f_H$;
generating $f_L$, $f_M$ and $f_H$ control signals as a function of the difference between an average energy level for the compensated output signal and the energy at each of the frequencies $f_L$, $f_M$ and $f_H$; and
applying said $f_L$, $f_M$ and $f_H$ control signals as feedback signals to adjust the received signal whereby the compensated output signal has substantially no tilt and reduced higher order distortion terms over the frequency range of interest.

4. The method of claim 3 wherein the adjustment of amplitude at frequency $f_M$ is utilized to compensate for multipath "notch" effects in the received signal.

5. Apparatus for providing intelligence signal amplitude variation compensation wherein signals other than the intelligence signals are not utilized in the compensation process, comprising, in combination:
a plurality of data signal frequency dependent loss means each for adjusting signal amplitudes adjacent given individual data signal frequencies, said signal frequency dependent loss means each including control signal input means;
apparatus signal input means;
apparatus signal output means;
means connecting said plurality of data signal frequency dependent loss means between said signal input means and said signal output means; and
feedback means connected between said signal output means and said control means of each of said data signal frequency dependent loss means for adjusting the various loss values over a given range of frequencies toward a constant spectral level of signal amplitudes for the range, the constant spectral level being based on the difference between an average energy level for compensated output signals and the energy at frequency of each of said data signal loss means.

6. The method of amplitude adjusting a received signal between the frequencies $f_L$ and $f_H$ and outputting an amplitude compensated signal comprising, in combination:
first means adjusting the amplitude of received signals at each of the frequencies $f_L$, $f_M$ and $f_H$ as a function of $f_L$, $f_M$ and $f_H$ control signals where $f_M$ is intermediate to $f_L$ and $f_H$ to provide an amplitude compensated output signal;
second means for generating $f_L$, $f_M$ and $f_H$ control signals as a function of the difference between an average energy level for the compensated output signal and the energy at each of the frequencies $f_L$, $f_M$ and $f_H$; and
third means connecting said second means to said first means for applying said $f_L$, $f_M$ and $f_H$ control signals as feedback signals to adjust the received signals whereby the compensated output signal has substantially no tilt and reduced higher order distortion terms over the frequency range of interest.

* * * * *

UNITED STATES PATENT AND TRADEMARK OFFICE
CERTIFICATE OF CORRECTION

PATENT NO. : 4,251,782
DATED : 02/17/81
INVENTOR(S) : Brian T. Bynum

It is certified that error appears in the above-identified patent and that said Letters Patent are hereby corrected as shown below:

Column 2, line 5  replace "frequencyrelated" with --frequency related--.

Column 2, delete the formula on lines 15, 16, & 17:

and replace it with --

$$R(s) = K_0 T(s) + K_1 s\, T(s) + K_2 s^2\, T(s) + \ldots K_m s^m\, T(s) =$$
$$K_0 T(s) + K_1' f_n T(s) + K_2' f_n^2\, T(s) + \ldots K_m' f_n^m\, T(s).$$

Column 7, line 5  delete "meas" and substitute therefor with --means--.

Signed and Sealed this

Sixteenth Day of June 1981

[SEAL]

Attest:

RENE D. TEGTMEYER

*Attesting Officer*  *Acting Commissioner of Patents and Trademarks*